(12) United States Patent
Luo et al.

(10) Patent No.: US 9,606,598 B2
(45) Date of Patent: Mar. 28, 2017

(54) AUTOMATIC TUNING FOR A MEMORY VOLTAGE REGULATOR

(71) Applicant: Dell Products, LP, Round Rock, TX (US)

(72) Inventors: Shiguo Luo, Austin, TX (US); Ralph H. Johnson, III, Round Rock, TX (US); John E. Jenne, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 54 days.

(21) Appl. No.: 14/729,558

(22) Filed: Jun. 3, 2015

(65) Prior Publication Data

US 2016/0357234 A1    Dec. 8, 2016

(51) Int. Cl.
G06F 1/26 (2006.01)
G06F 1/32 (2006.01)
G06F 17/30 (2006.01)

(52) U.S. Cl.
CPC ............ *G06F 1/26* (2013.01); *G06F 1/32* (2013.01); *G06F 17/30424* (2013.01)

(58) Field of Classification Search
CPC .............. G06F 1/26; G06F 1/263; G06F 1/32
USPC ........................................................ 713/300
See application file for complete search history.

(56) References Cited

U.S. PATENT DOCUMENTS

| | | | |
|---|---|---|---|
| 7,132,764 B2 | 11/2006 | Kumar et al. | |
| 7,675,805 B2 * | 3/2010 | Ang | G11C 16/30 365/205 |
| 8,321,705 B2 * | 11/2012 | Lakhanpal | G06F 1/3203 323/268 |
| 8,766,647 B2 | 7/2014 | Leibowitz et al. | |
| 9,208,832 B2 * | 12/2015 | Deng | G11C 29/50004 |
| 9,213,397 B2 * | 12/2015 | Jouin | G06F 1/3243 |
| 9,396,768 B2 * | 7/2016 | DeCesaris | G11O 5/147 |
| 2010/0250973 A1 | 9/2010 | Breen, III et al. | |
| 2011/0051479 A1 | 3/2011 | Breen et al. | |
| 2011/0080151 A1 | 4/2011 | Rahardjo et al. | |
| 2012/0151225 A1 | 6/2012 | Huang et al. | |
| 2013/0099766 A1 | 4/2013 | Luo et al. | |
| 2013/0106373 A1 | 5/2013 | Luo et al. | |
| 2013/0339777 A1 * | 12/2013 | Varma | G06F 1/26 713/340 |
| 2014/0068282 A1 | 3/2014 | Jenne | |
| 2014/0232420 A1 | 8/2014 | Luo et al. | |
| 2014/0253101 A1 | 9/2014 | Luo et al. | |
| 2014/0310537 A1 | 10/2014 | Messick et al. | |
| 2014/0310539 A1 | 10/2014 | Messick et al. | |
| 2014/0380069 A1 | 12/2014 | Berke et al. | |
| 2016/0018833 A1 * | 1/2016 | Richards, III | G05F 1/46 700/298 |

OTHER PUBLICATIONS

Jenne et al., Whitepaper "Dell Energy Smart Architecture (DESA) for 11G Rack and Tower Servers," Dell, Inc., 2009, pp. 1-44.

* cited by examiner

*Primary Examiner* — Chun Cao
(74) *Attorney, Agent, or Firm* — Larson Newman, LLP (57) ABSTRACT

A voltage regulator may be tuned to reduce consumption of electrical power. An installed configuration of a dual inline memory module is used to load test the voltage regulator. Results of the load test may then reveal tuning parameters that make the voltage regulator more efficient.

17 Claims, 9 Drawing Sheets

AUTOMATIC TUNING FOR A MEMORY VOLTAGE REGULATOR

FIELD OF THE DISCLOSURE

The present disclosure generally relates to information handling systems, and more particularly, to automatic tuning of a voltage regulator.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
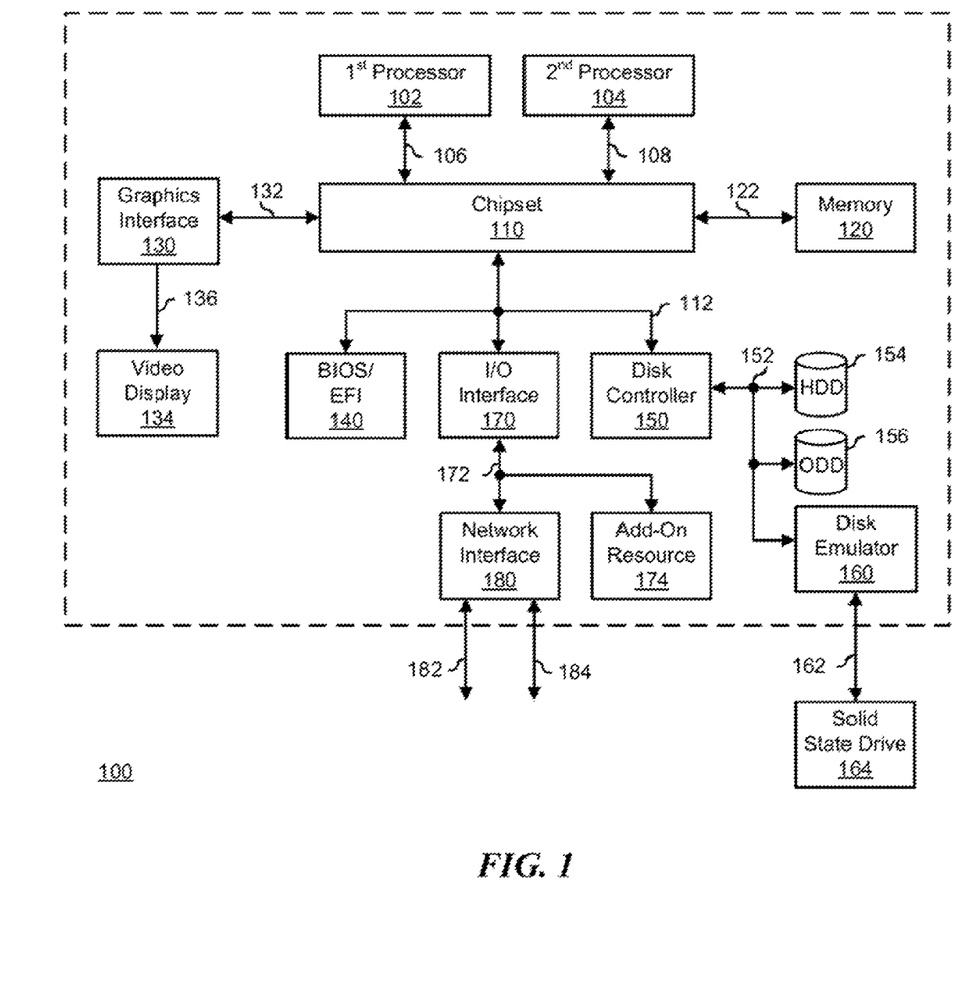
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
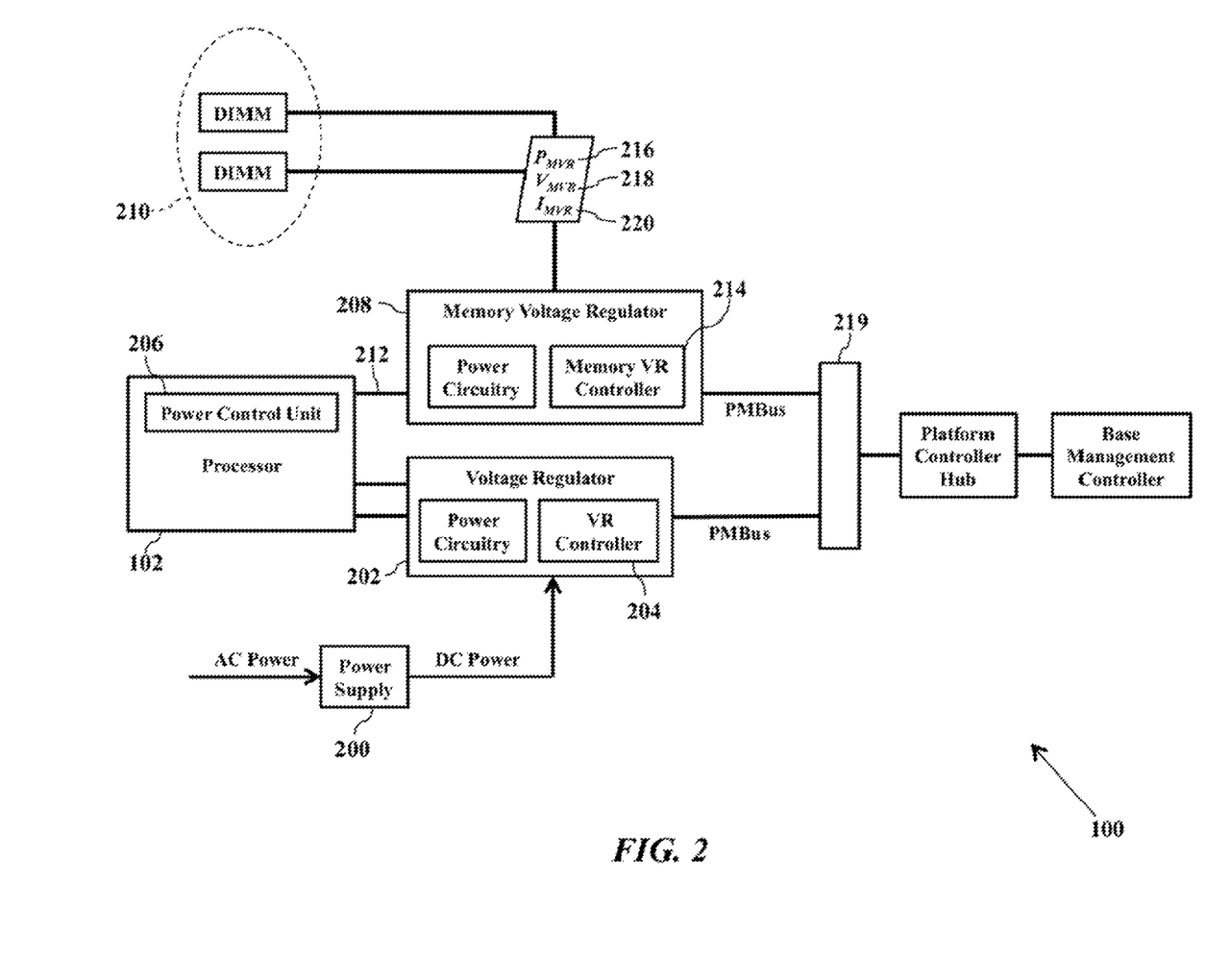
FIG. 2 illustrates more componentry of the information handling system, according to exemplary embodiments.

FIG. 2 illustrates more componentry of the information handling system 100, according to exemplary embodiments. One or more power supplies 200 provide electrical power to the information handling system 100. A voltage regulator 202 receives the electrical power produced by the power supply 200, and a voltage regulator ("VR") controller 204 manages the operation of the voltage regulator 202. The voltage regulator controller 204 thus ensures the electrical condition of the electrical power produced by the power supply 200. Electrical power is then provided from the voltage regulator 202 to the components of the information handling system 100. The processor 102, for example, may receive some of the electrical power, and a power control unit 206 manages at least some of the electrical power consumed by the information handling system 100. The power control unit 206, for example, receives status messages from the processor 102 and manages the electrical power in response to the status messages. Electrical power is also provided to one or more memory voltage regulators 208. The memory voltage regulator 208 couples to the power control unit 206 and manages the electrical power consumed by Dual In-line Memory Modules (or "DIMM") 210. For simplicity, FIG. 2 only illustrates two (2) DIMM modules. In practice, though, exemplary embodiments may manage the electrical power consumed by many DIMM modules. Regardless, when the DIMM 210 and the power control unit 206 establish communication (such as over a bus), the DIMM 210 may send status and/or configuration messages to the power control unit 206. The power control unit 206 receives the status and/or configuration of the DIMM 210 and generates command messages 212. The command messages 212 may be sent using a physical communications link, such as an inter-integrated circuit ("I²C") bus or a power management bus ("PMBus"). The command messages 212, for example, may be serial vendor identification ("SVID") interface messages, which are known and need not be explained in detail. The command messages 212 are sent to the memory voltage regulator 208. The command messages 212 are thus used by a memory voltage regulator ("VR") controller 214 to independently or jointly control the memory voltage regulator 208.

Exemplary embodiments include additional interfaces. As FIG. 2 illustrates, exemplary embodiments may include a digital interface 219 to the voltage regulator 202 and/or to the memory voltage regulator 208. The digital interface 219 may utilize the PMBus and/or the I²C bus, which are both known and need not be explained in detail. The digital interface 219 may then interface with and/or connect to a platform controller hub and a base management controller, which are both also architecturally known. Even though the command messages 212 may be used for voltage control, these messages are limited in capability. Exemplary embodiments may thus establish a second interface with the processor 102 and/or the power control unit 206 to provide additional capabilities using a different architectural circuit path. The digital interface 219 thus provides an additional management interface for the base management controller using the PMBus standard.

The memory voltage regulator 208 may thus be controlled to produce a constant or variable output power $P_{MVR}$ (illustrated as reference numeral 216). The output power $P_{MVR}$ 216 may thus have a constant or variable output voltage $V_{MVR}$ (illustrated as reference numeral 218) and a constant or variable output current $I_{MVR}$ (illustrated as reference numeral 220). The power control unit 206 and/or the base management controller may thus efficiently coordinate and manage the electrical power consumed by the processor 102 and/or by the DIMM 210, based on the status and/or configuration of the DIMM 210.

Figure 3:
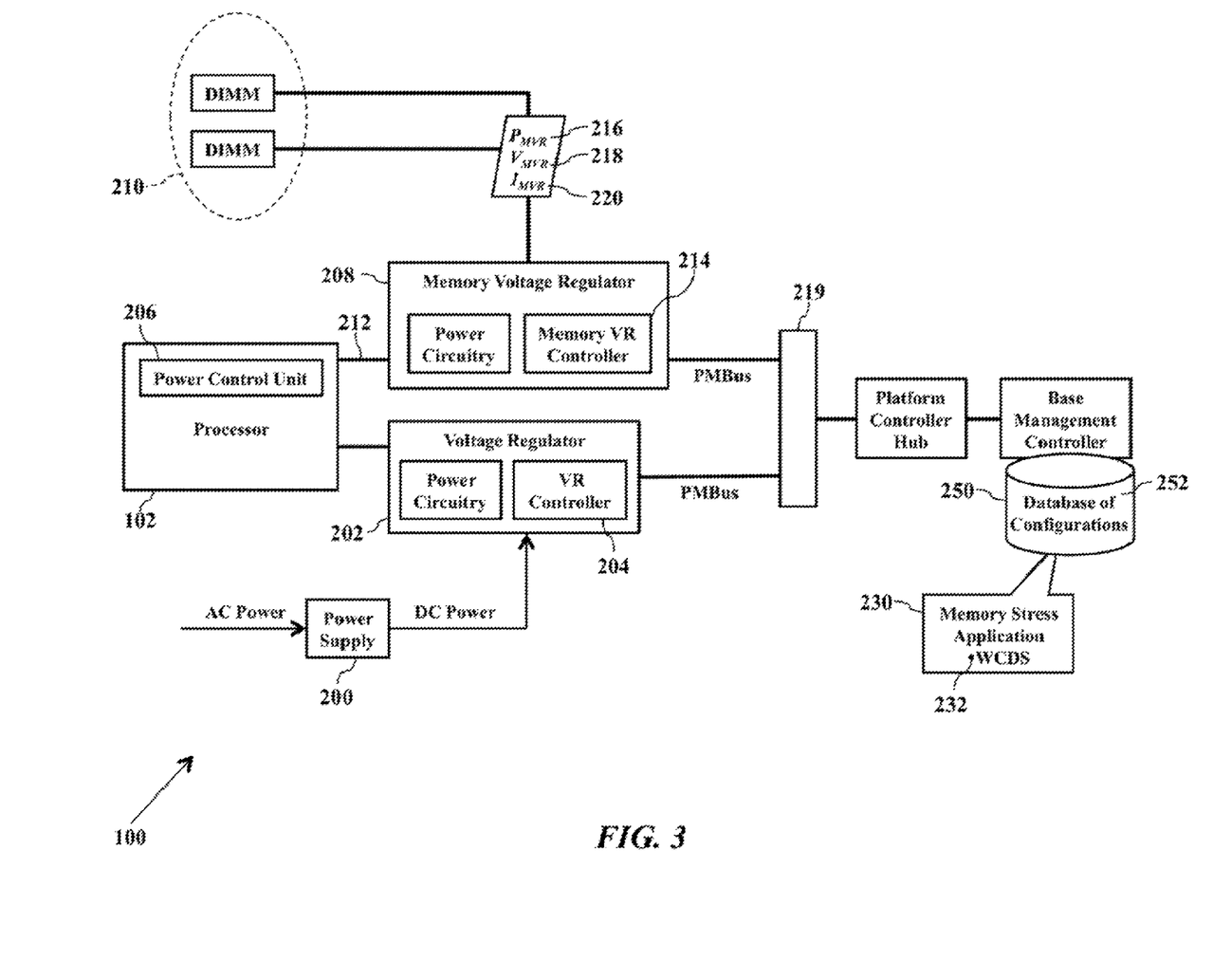
FIG. 3 is a block diagram illustrating power control, according to exemplary embodiments.

FIG. 3 is a block diagram illustrating power control, according to exemplary embodiments. Here the memory voltage regulator 208 may be tuned or adjusted to consume less electrical power, based on the status and/or configuration of the installed DIMM 210. Conventional memory voltage regulators are designed to meet the different specifications for a wide range of possible installed memory configurations that are supplied by numerous vendors. Conventional memory voltage regulators are thus required to meet many design specifications, including any worst-case load requirements. Here, though, the memory voltage regulator 208 may self-adjust or optimize to the actual installation configuration of the DIMM 210. The memory voltage regulator 208, in other words, may assume a single design setting that satisfies the electrical power requirements of the installed DIMM 210. The memory voltage regulator 208 may thus operate more efficiently from a worst-case scenario, thus reducing consumption of electrical power. Indeed, in testing exemplary embodiments have been shown to save in excess of six (6) Watts on a DELL® R920 computing platform using four (4) memory risers and as much as twelve (12) Watts in an eight (8) riser memory configuration over a processor manufacturer's guidance.

As FIG. 3 illustrates, exemplary embodiments may stress test the memory voltage regulator 208. A memory stress application 230 may be executed that loads the memory voltage regulator 208 according to a load test 232. FIG. 3 illustrates the memory stress application 230 being logically associated with the base management controller and stored for execution by any of the processors (such as the processor 102). The memory stress application 230 may thus be stored in or by any memory component (such as the memory 120, the hard disk drive 154, the optical disk drive 156, or the solid state drive 164). Regardless, the memory stress application 230 has instructions, programming, or code that causes the processor 102 to perform operations, such as load testing the voltage regulator 202 and/or the memory voltage regulator 208. For example, the memory voltage regulator 208 generates its output power $P_{MVR}$ 216 having the corresponding output voltage $V_{MVR}$ 218 and output current $I_{MVR}$ 220. When the DIMM 210 sends its status and/or configuration messages to the power control unit 206, the power control unit 206 may send, forward, or copy those messages for use by the memory stress application 230. The memory stress application 230 may thus be updated with the configuration of the installed DIMM 210. Exemplary embodiments may then poll the voltage regulator 202 and/or the memory voltage regulator 208 using the interface 219 with the power control unit 206. For example, the memory stress application 230 may query for the results of the load test 232 for the specific configuration of the installed DIMM 210. The memory voltage regulator 208 may thus respond by sending the average load output current $I_{MVR}$ 220 and/or the output power $P_{MVR}$ 216 generated during the load test 232. For example, the memory voltage regulator 208 may report the output voltage $V_{MVR}$ 218 and/or the output current $I_{MVR}$ 220 generated in response to a worst case demand scenario based on the specific configuration of the installed DIMM 210. Exemplary embodiments may then query a database 250 of configurations for the corresponding range of the output current $I_{MVR}$ 220 matching the reported value during the stress testing of the installed DIMM configuration. FIG. 3 illustrates the database 250 of configurations being locally stored, yet some or all of the entries in the database 250 of configurations may be additionally or alternatively remotely stored. The database 250 of configurations stores different configurations 252 for the voltage regulator 202 and/or the memory voltage regulator 208 in electronic database associations to different measurement values of the output current $I_{MVR}$ 220. Exemplary embodiments may retrieve one of the different configurations 252 that corresponds to the output voltage $V_{MVR}$ 218 and/or the output current $I_{MVR}$ 220 generated in response to the load test 232. Exemplary embodiments, in other words, may thus select a single operational configuration 252 having a database association to the output power $P_{MVR}$ 216, the output voltage $V_{MVR}$ 218, and/or the output current $I_{MVR}$ 220 generated during the load test 232. The corresponding configuration 252 may be sent to the voltage regulator controller 204 (perhaps using the digital interface 219). The voltage regulator controller 204 thus knows the maximum required output power $P_{MVR}$ 216, output voltage $V_{MVR}$ 218, and/or output current $I_{MVR}$ 220 for the DIMM 210 configuration.

Figure 4:
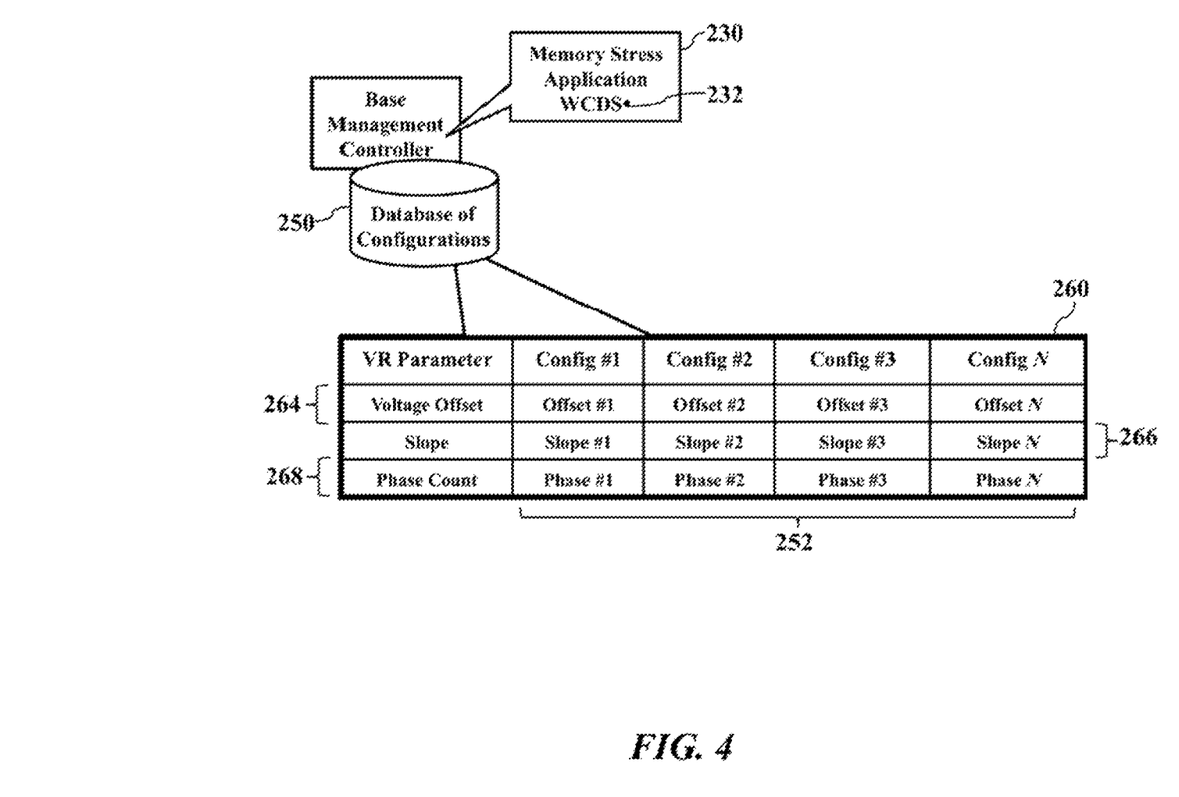
FIGS. 4-5 are schematics illustrating tuning objectives, according to exemplary embodiments.
Figure 5:
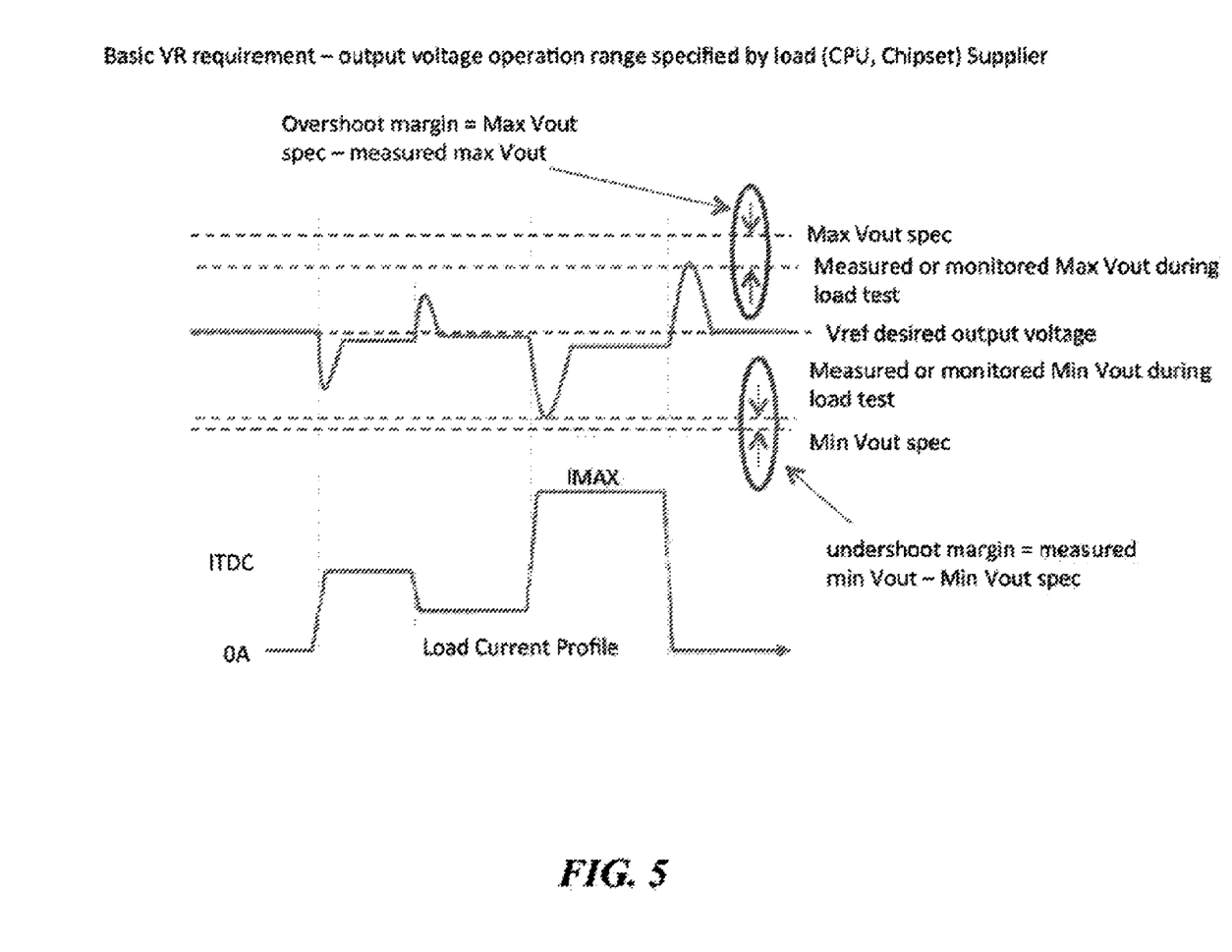

FIGS. 4-5 are schematics illustrating tuning objectives, according to exemplary embodiments. Here the database 250 of configurations stores different configurations for a voltage regulator (such the voltage regulator 202 and/or the memory voltage regulator 208 illustrated in FIGS. 2-3). While the database 250 of configurations may have any physical or electronic construction, for simplicity FIG. 4 illustrates a table 260. The database 250 of configurations thus maps, relates, or associates different configurations 252 to different tuning parameters. While FIG. 4 only illustrates a few entries in the table 260, in practice the database 250 of configurations may have many entries for many different configurations. For example, when the memory voltage regulator 208 is subjected to the worst case demand scenario (as explained with reference to FIG. 3), the memory voltage regulator 208 reports the corresponding output power $P_{MVR}$ 216 (e.g., the output voltage $V_{MVR}$ 218 and/or the output current $I_{MVR}$ 220). Exemplary embodiments may then query the table 260 and retrieve the corresponding configuration 252. While the different configurations 252 may be represented with any information or parameters, FIG. 4 illustrates different voltage offsets 264, different slopes 266 of an output voltage load-line, and different phase counts 268. Exemplary embodiments may thus select the appropriate configuration trio 252 (voltage offset 264, slope 266, and/or phase count 268) that have been pre-configured or optimized for the output current $I_{MVR}$ 220. So, whatever output is measured (the output power $P_{MVR}$ 216, the output voltage $V_{MVR}$ 218, and/or the output current $I_{MVR}$ 220), the corresponding configuration 252 may be retrieved.

FIG. 5 graphically illustrates the results of a load test. As the memory voltage regulator 208 is tested, the output voltage $V_{MVR}$ 218 may be regulated within a specified range of voltage values. The output power $P_{MVR}$ 216 may thus also be regulated within a specified range of power values. The output current $I_{MVR}$ 220 may also lie within a specified range of current values. If a tuning objective is to minimize the output power $P_{MVR}$ 216, exemplary embodiments may tune the voltage regulator 202 and/or the memory voltage regulator 208 parameters (voltage offset 264, slope 266, and/or phase count 268).

The voltage offset 264 accounts for impedance. The electrical power delivery path has several resistive impedances, as the memory voltage regulator 208 regulates its output voltage $V_{MVR}$ 218 at a remote sensing point located on a motherboard (instead of at the memory IC itself). In order to account for these impedances the output voltage $V_{MVR}$ 218 may be offset from its target voltage (using the voltage offset 264). Exemplary embodiments thus cause the voltage regulator controller 204 (illustrated in FIGS. 2 & 3)

to deliver the correct voltage to the DIMM assembly (or, more accurately to the memory ICs located up on the DIMM PWB).

These power delivery impedances may also cause a voltage drop that varies with the memory load current. The worst case (highest) load current, along with additional design margin, drives the recommended output voltage offset 264. Characterizing the effects of these impedances as function of load current identifies available voltage margin when operating at load current below the maximum worst case.

Exemplary embodiments may also adjust the slope 266 of an output voltage load-line. The slope 266 of the load line may be adjusted based upon knowing the installed memory's worst case loading (e.g., the output voltage $V_{MVR}$ 218 and/or the output current $I_{MVR}$ 220). The change in the slope 266 is incorporated within the lookup table 260 and tunes the design configuration 252 of the memory voltage regulator 208. The load line drops the voltage linearly as the load current increases. The power dissipated by the load also drops. Under transient load swings, exemplary embodiments may position the voltage at one end of a voltage window when it flies to another end of the voltage window. For example, under full load the voltage may drop to a lower end of a voltage specification. When the load is reduced the voltage transient will fly up above steady state. Because the pre-positioned voltage starts lower than nominal steady state, it does not fly very high above steady during the transient. The same is true when going from light load to full load.

Exemplary embodiments may start with minimum voltage at DIMM gold fingers as noted in a processor manufacturer's literature. Add to this a worst case voltage distribution losses measured on the board. Add to this the IR drop of the DIMM connector using the End-of-Life impedance value. Select a target output voltage level and a load-line and apply a worst-case tolerance band analysis based on a voltage regulator controller reference voltage and inductor DCR variance to find minimum regulation voltage as a function of load. Subtract from the load-line the measured transient load application transient deviation The allowance for the transient deviation must stay above the total stack-up for at least until the point at which the max current step is not possible. For example, if the peak current is 20 A, and the specified load step is 15 A, once the load current is greater than 5 A, a 15 A step is no longer possible. As a result, the peak transient deviation will not occur beyond these current levels, as the step will be smaller.

Tables 1 and 2 below provide some configuration values. Table 1 illustrates the different configurations 252 for a supply voltage $V_{DDQ}$=1.5 Volts, and Table 2 illustrates the different configurations 252 for the supply voltage $V_{DDQ}$=1.35 Volts. The characterization current is constructed based on the knowledge the specific motherboard's memory power delivery path. The entire memory load current range is divided into discrete buckets or ranges of values. When the maximum load output current $I_{MVR}$ 220 is determined for the installed DIMM 210 configuration, the output current $I_{MVR}$ 220 will lie within one of the buckets. The corresponding configuration parameters may then be modified based on the corresponding voltage offset 264 and/or slope 266.

TABLE 1

(Exemplary $V_{DDQ}$ = 1.5 Volts)

| | Voltage Regulator Configuration | | | | |
|---|---|---|---|---|---|
| | $I_{MVR} \leq$ 10 | 10 < $I_{MVR} \leq$ 20 | 20 < $I_{MVR} \leq$ 25 | 25 < $I_{MVR} \leq$ 40 | 40 < $I_{MVR}$ |
| Voltage Offset (mV) | −10 | 0 | 0 | 5 | 10 |
| Slope of Load Line (Ohms) | 0.0008 | 0.0004 | 0.0002 | 0.0002 | 0.0002 |

TABLE 2

(Exemplary $V_{DDQ}$ = 1.2 Volts)

| | Voltage Regulator Configuration | | | |
|---|---|---|---|---|
| | $I_{MVR} \leq$ 10 | 10 < $I_{MVR} \leq$ 20 | 20 < $I_{MVR} \leq$ 35 | 35 < $I_{MVR}$ |
| Voltage Offset (mV) | −10 | 5 | 10 | 5 |
| Slope of Load Line (Ohms) | 0.0008 | 0.0006 | 0.0004 | 0.0002 |

Conventional memory voltage regulators are thus required to meet many design specifications, including any worst-case load requirements. Here, though, the memory voltage regulator 208 may self-adjust or optimize to the actual installation configuration of the DIMM 210.

Exemplary embodiments thus support many DIMM configurations. Even though there may be many different DIMM configurations, Tables 1 and 2 above group all the different DIMM configurations into a finite number of buckets based on memory load ranges. Furthermore, each load range results in VR tuning for the worst case DIMM configuration in that load range.

Exemplary embodiments may thus derive a custom configuration for any voltage regulator. Exemplary embodiments propose a new scheme for tuning any voltage regulator that provides a custom set of configuration parameters by running a stress application on the installed DIMM configuration. The result is a worst case load transient from which minimum and maximum voltage excursions may be measured. Exemplary embodiments may then derive or retrieve the offset 264 and/or the load-line slope 266. Exemplary embodiments may thus generate a worst case load transient response that the given installed DIMM configuration can provide. Custom tuning may then proceed by measuring maximum and minimum voltage excursions and peak currents from the voltage regulator once the stress test is complete. Based on these parameters the custom the offset 264 and/or the load-line slope 266 may be applied. This custom tuning is optimized to result in the minimum power delivered and yet still maintaining the required voltage regulation envelope at the load.

Figure 6:
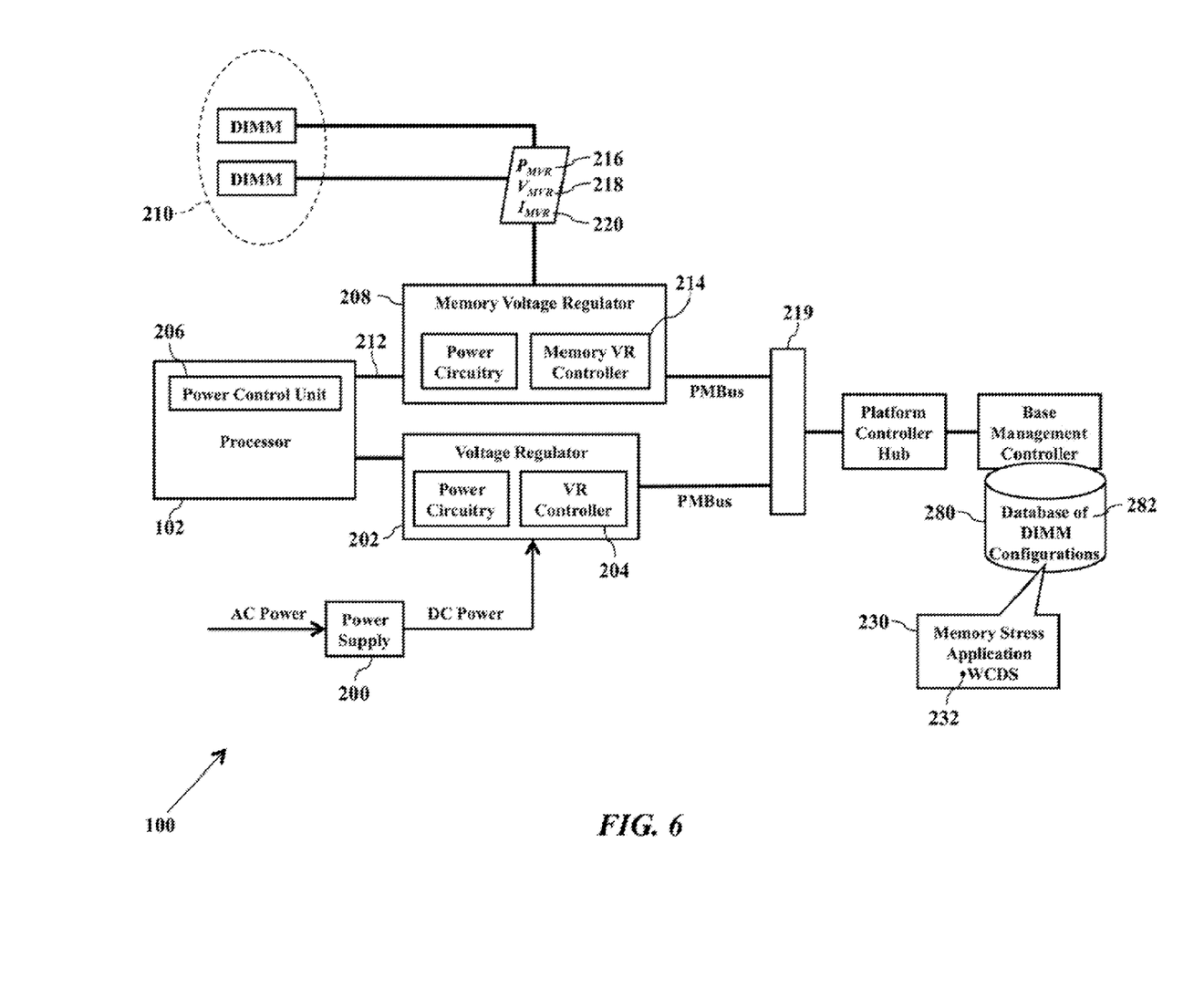
FIG. 6 is a schematic illustrating a database of DIMM configurations, according to exemplary embodiments.

FIG. 6 is a schematic illustrating a database 280 of DIMM configurations, according to exemplary embodiments. Here exemplary embodiments may tune any voltage regulator merely based on the installed DIMM configuration 282. As this disclosure previously explained, there may be many different specifications for the DIMM 210, due to a wide range of possible installed memory configurations from numerous vendors. Exemplary embodiments may thus configure the database 280 of DIMM configurations to account for the many different possible specifications for the installed DIMM 210. When the DIMM 210 reports its installed configuration, the memory stress application 230 may query the database 280 of DIMM configurations for the installed DIMM configuration 282. The memory stress application 230 may then retrieve the worst case demand scenario 232 that corresponds to the installed DIMM configuration 282. The memory stress application 230, for example, need not first load test the memory voltage regulator 208. FIG. 6 illustrates the database 280 of DIMM configurations being locally stored, yet some or all of the entries in the database 280 of DIMM configurations may be additionally or alternatively remotely stored. The database 280 of DIMM configurations stores different DIMM configurations 282 in electronic database associations to different worst case demand scenarios 232. Exemplary embodiments may retrieve one of the different worst case demand scenarios 232 that corresponds to the installed DIMM configuration 282. Exemplary embodiments, in other words, may thus select a single worst case demand scenario 232 having a database association to the installed DIMM configuration 282. The database 280 of DIMM configurations may thus be preloaded or updated with different worst case demand scenarios 232 as the DIMM configurations 282 change.

Figure 7:
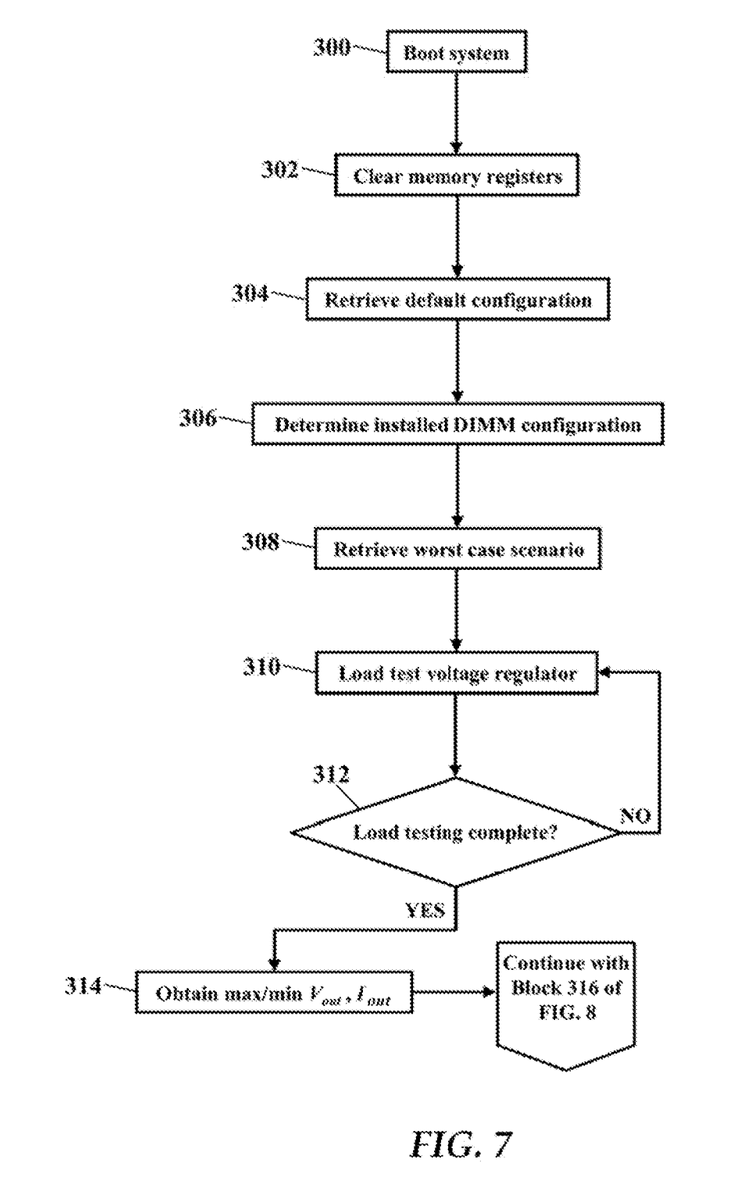
FIGS. 7-9 are flowcharts illustrating a method or algorithm for automatic tuning of a voltage regulator, according to exemplary embodiments.
Figure 8:
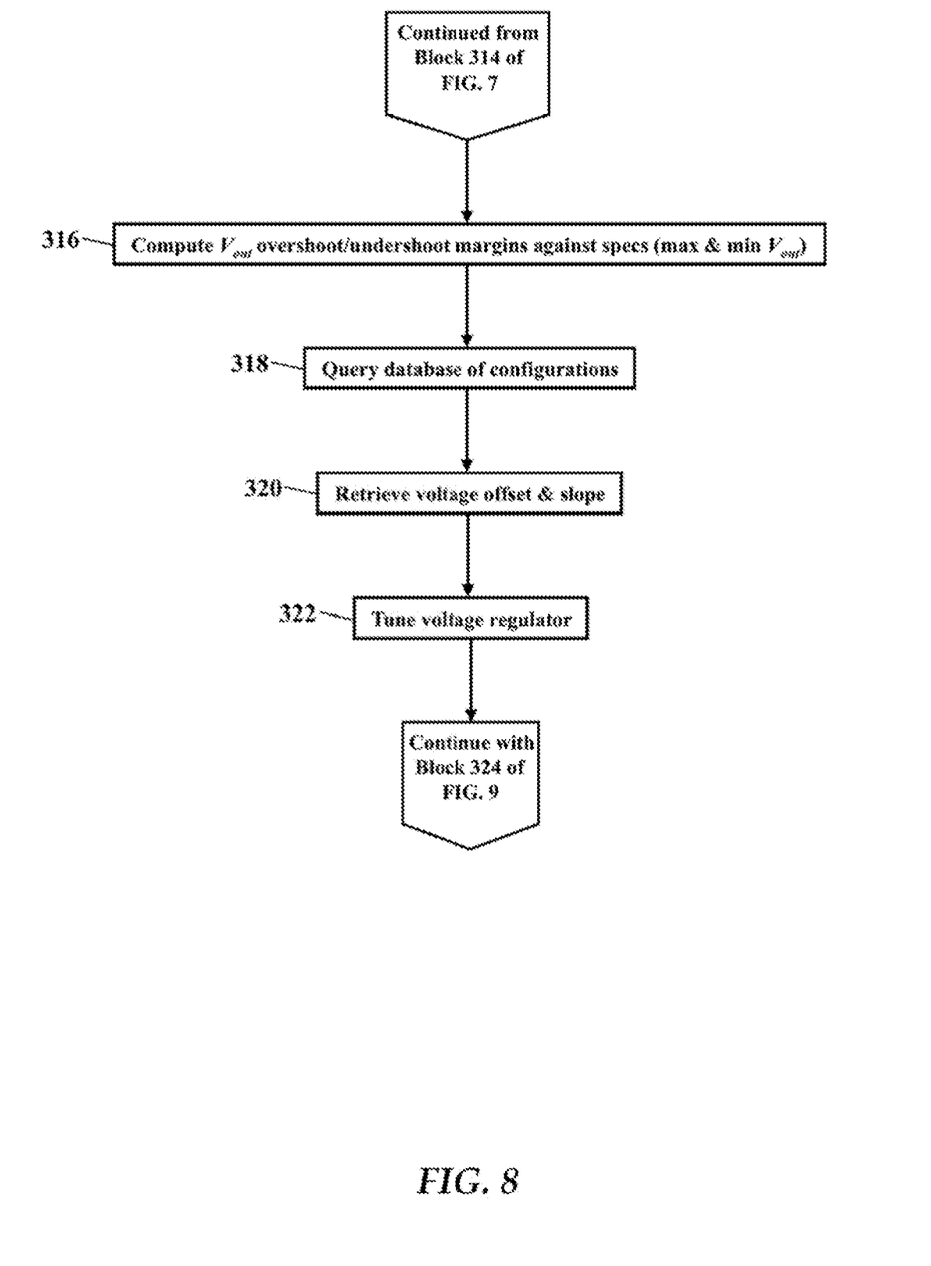
Figure 9:
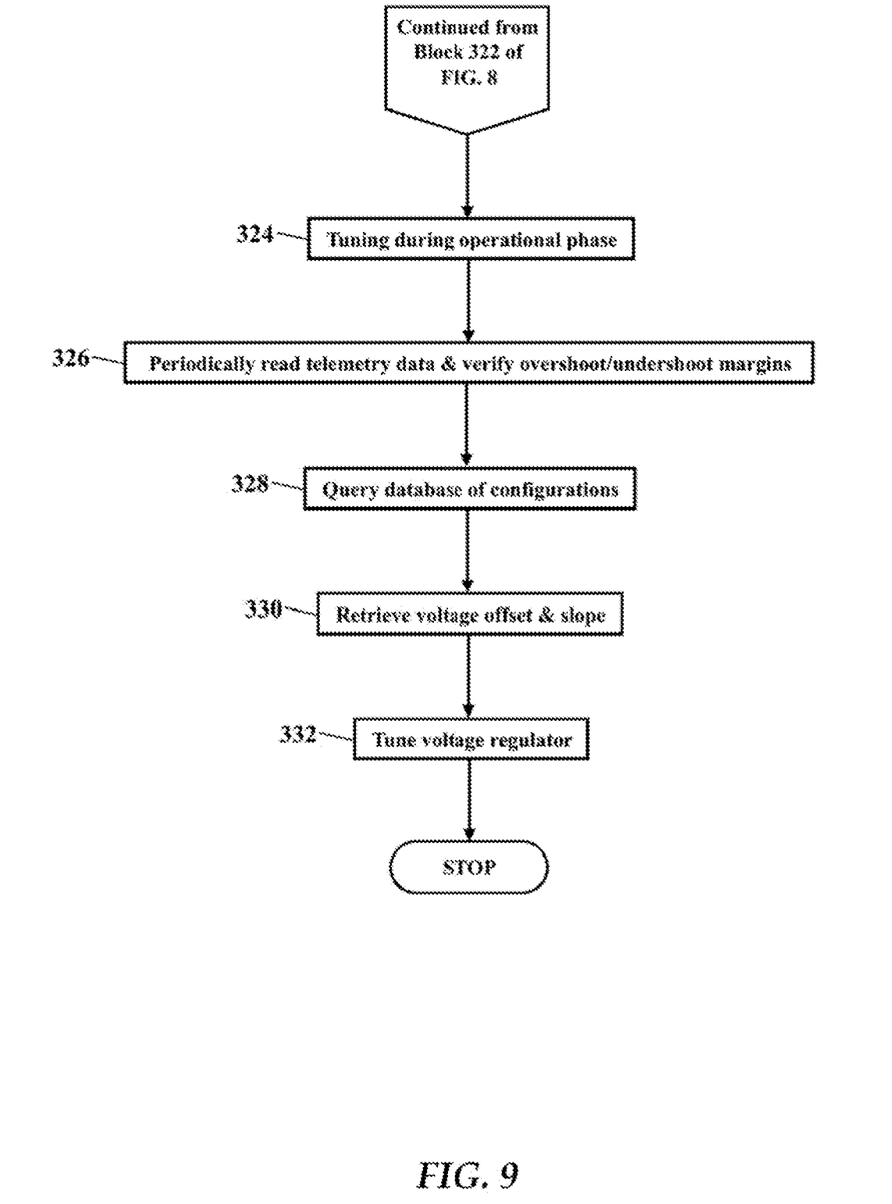

FIGS. 7-9 are flowcharts illustrating a method or algorithm for automatic tuning of the voltage regulator 202, according to exemplary embodiments. FIG. 7 illustrates a start-up phase tuning that is performed at system boot-up (Block 300). Any memory registers are cleared (Block 302). A default configuration is retrieved (Block 304) that specifies default values for the voltage offset 264 and/or for the slope 266 of the load line. The installed configuration 252 of the DIMM 210 is determined (Block 306). The worst case demand scenario 232 is retrieved based on the installed DIMM configuration 252 (Block 308). The voltage regulator is load tested (Block 310). When the load testing is completed for all memory channels (Block 312), the output results (the maximum and minimum output voltage $V_{MVR}$ 218 and/or the output current $I_{MVR}$ 220) is/are obtained from a power management bus (Block 314).

The flowchart continues with FIG. 8. Overshoot and undershoot margins for the output voltage $V_{MVR}$ 218 may be computed and compared to a specification (such as a maximum and minimum values for the output voltage $V_{MVR}$ 218) (Block 316). The database 250 of configurations is queried for the results of the load test (Block 318) and the voltage offset 264 and the slope 266 are retrieved (Block 320). The voltage regulator 202 is then tuned (Block 322) using the voltage offset 264 and the slope 266.

The flowchart may continue with FIG. 9. Now that the start-up phase tuning is complete, exemplary embodiments may continue tuning the voltage regulator 202 during running operation, if desired. FIG. 9, then, illustrates continued tuning during an operational phase after boot-up (Block 324). As the voltage regulator 202 operates, the voltage regulator controller 204 and/or the memory voltage regulator controller 214 generates or produces the real-time output power $P_{MVR}$ 216, the output voltage $V_{MVR}$ 218, and/or the output current $I_{MVR}$ 220. This telemetry data may be periodically read compared to the overshoot and undershoot margins (Block 326). The database 250 of configurations may be queried for the real-time results (Block 328) and the voltage offset 264 and the slope 266 are retrieved (Block 330). The voltage regulator 202 is then tuned (Block 332) using the voltage offset 264 and the slope 266.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
    determining, by an information handling system, an installed configuration associated with a dual inline memory module;
    querying, by the information handling system, an electronic database for the installed configuration associated with the dual inline memory module, the electronic database having electronic database associations between different configurations of the dual inline memory module and different load tests for a voltage regulator;
    retrieving, by the information handling system, one of the different load tests having a database association to the installed configuration associated with the dual inline memory module; and
    load testing, by the information handling system, the voltage regulator according to the load test having the database association to the installed configuration associated with the dual inline memory module.

2. The method of claim 1, further comprising determining an output current produced by the voltage regulator in response to the load test having the database association to the installed configuration associated with the dual inline memory module.

3. The method of claim 2, further comprising retrieving a voltage offset that corresponds to the output current.

4. The method of claim 2, further comprising retrieving a slope of a load line that corresponds to the output current.

5. The method of claim 1, further comprising determining an output voltage produced by the voltage regulator in response to the load test having the database association to the installed configuration associated with the dual inline memory module.

6. The method of claim 5, further comprising retrieving a voltage offset that corresponds to the output voltage.

7. The method of claim 5, further comprising retrieving a slope of a load line that corresponds to the output voltage.

8. An information handling system, comprising:
    a processor; and
    a memory accessible to the processor, the memory storing instructions that when executed cause the processor to perform operations, the operations comprising:
    determining an installed configuration associated with a dual inline memory module;
    querying an electronic database for the installed configuration associated with the dual inline memory module, the electronic database having electronic database associations between different configurations of the dual inline memory module and different load tests for a voltage regulator;
    retrieving one of the different load tests having a database association to the installed configuration associated with the dual inline memory module; and
    load testing the voltage regulator according to the load test having the database association to the installed configuration associated with the dual inline memory module.

9. The information handling system of claim 8, wherein the operations further comprise determining an output current produced by the voltage regulator in response to the load test having the database association to the installed configuration associated with the dual inline memory module.

10. The information handling system of claim 9, wherein the operations further comprise retrieving a voltage offset that corresponds to the output current.

11. The information handling system of claim 9, wherein the operations further comprise retrieving a slope of a load line that corresponds to the output current.

12. The information handling system of claim 8, wherein the operations further comprise determining an output voltage produced by the voltage regulator in response to the load test having the database association to the installed configuration associated with the dual inline memory module.

13. The information handling system of claim 12, wherein the operations further comprise retrieving a voltage offset that corresponds to the output voltage.

14. The information handling system of claim 9, wherein the operations further comprise retrieving a slope of a load line that corresponds to the output voltage.

15. An information handling system, comprising:
    a processor; and
    a memory accessible to the processor, the memory storing instructions that when executed cause the processor to perform operations, the operations comprising:
    determining an installed configuration associated with a dual inline memory module;
    querying an electronic database for the installed configuration associated with the dual inline memory module, the electronic database having electronic database associations between different configurations of the dual inline memory module and different load tests for a voltage regulator;
    retrieving one of the different load tests having a database association to the installed configuration associated with the dual inline memory module;

load testing the voltage regulator according to the load test having the database association to the installed configuration associated with the dual inline memory module;

determining an output current produced by the voltage regulator in response to the load test having the database association to the installed configuration associated with the dual inline memory module;

querying another electronic database for the output current produced by the voltage regulator in response to the load test, the another electronic database associating different ranges of currents to different operational configurations for the voltage regulator;

retrieving an operational configuration for the voltage regulator that corresponds with the output current produced by the voltage regulator in response to the load test; and tuning the voltage regulator according to the operational configuration.

16. The information handling system of claim 15, wherein the operations further comprise retrieving a voltage offset that corresponds to the output current produced by the voltage regulator in response to the load test.

17. The information handling system of claim 15, wherein the operations further comprise retrieving a slope of a load line that corresponds to the output current produced by the voltage regulator in response to the load test.

* * * * *